(12) United States Patent
Miyamura et al.

(10) Patent No.: US 12,417,046 B2
(45) Date of Patent: Sep. 16, 2025

(54) TAPE DRIVE REPOSITIONING

(71) Applicant: INTERNATIONAL BUSINESS MACHINES CORPORATION, Armonk, NY (US)

(72) Inventors: Tsuyoshi Miyamura, Yokohama (JP); Setsuko Masuda, Toshima-ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/524,702

(22) Filed: Nov. 30, 2023

(65) Prior Publication Data

US 2025/0181261 A1 Jun. 5, 2025

(51) Int. Cl.
*G06F 3/06* (2006.01)

(52) U.S. Cl.
CPC .......... *G06F 3/0643* (2013.01); *G06F 3/0604* (2013.01); *G06F 3/0686* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; (Continued)

(56) References Cited

U.S. PATENT DOCUMENTS 8,918,651 B2 * 12/2014 Greco ..................... G06F 21/80
                                                    713/193
9,230,600 B2 * 1/2016 Itagaki ............... H04N 21/4334
(Continued)

OTHER PUBLICATIONS

Disclosed Anonymously, "Performance measurement of LTFS on tape drive," An IP.com Prior Art Database Technical Disclosure, IP.com No. IPCOM000271638D, Jan. 24, 2023, 4 pages.

*Primary Examiner* — Daniel C. Chappell
(74) *Attorney, Agent, or Firm* — James L. Olsen

(57) ABSTRACT

Aspects of the present disclosure relate to improved tape repositioning. Information associated with at least one preceding dataset on a tape medium is stored within a dataset information table (DSIT) of a dataset on the tape medium. A repositioning request specifying a target data position is received. The information associated with the at least one preceding dataset within the DSIT of the dataset is referenced while attempting to complete the repositioning request.

17 Claims, 8 Drawing Sheets

(58) Field of Classification Search
CPC .......... H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | |
|---|---|---|---|
| 10,078,466 B2* | 9/2018 | Hasegawa | G11B 27/00 |
| 10,331,348 B2* | 6/2019 | Ashida | G06F 3/0613 |
| 11,016,675 B2 | 5/2021 | Itagaki | |
| 11,176,968 B2 | 11/2021 | Miyamura | |
| 11,437,070 B1 | 9/2022 | Miyamura | |
| 11,635,914 B2 | 4/2023 | Miyamura | |
| 11,688,431 B2* | 6/2023 | Miyamura | G11B 27/107 |
| | | | 711/111 |
| 11,914,883 B2* | 2/2024 | Mitsuma | G06F 3/0659 |
| 2012/0054428 A1* | 3/2012 | Butt | G06F 3/0686 |
| | | | 711/111 |
| 2012/0079185 A1* | 3/2012 | Abe | G06F 3/065 |
| | | | 711/111 |
| 2012/0084500 A1* | 4/2012 | Jesionowski | G06F 3/0617 |
| | | | 711/111 |
| 2015/0127980 A1* | 5/2015 | Klein | G06F 11/1458 |
| | | | 714/15 |
| 2015/0347022 A1* | 12/2015 | Ashida | G06F 3/0686 |
| | | | 711/113 |
| 2022/0358967 A1* | 11/2022 | Miyamura | G11B 27/328 |
| 2023/0161654 A1 | 5/2023 | Tsuyoshi | |

* cited by examiner

TAPE DRIVE REPOSITIONING

BACKGROUND

The present disclosure relates generally to the field of tape systems, and more particularly to locating data within tape systems.

Magnetic tape systems store digital information on magnetic tape. Magnetic tapes can include a ferromagnetic material that, when exposed to a magnetic field, is magnetized. Tape systems use "tape heads" to apply magnetic flux to the ferromagnetic material of the tape medium to write data to the tape. Based on the stored magnetic imprint on the tape, binary data can be generated and read from the tape.

SUMMARY

Aspects of the present disclosure relate to a system, computer program product, and method for improving repositioning within a tape system. Information associated with at least one preceding dataset on a tape medium is stored within a dataset information table (DSIT) of a dataset on the tape medium. A repositioning request specifying a target data position is received. The information associated with the at least one preceding dataset within the DSIT of the dataset is referenced while attempting to complete the repositioning request.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
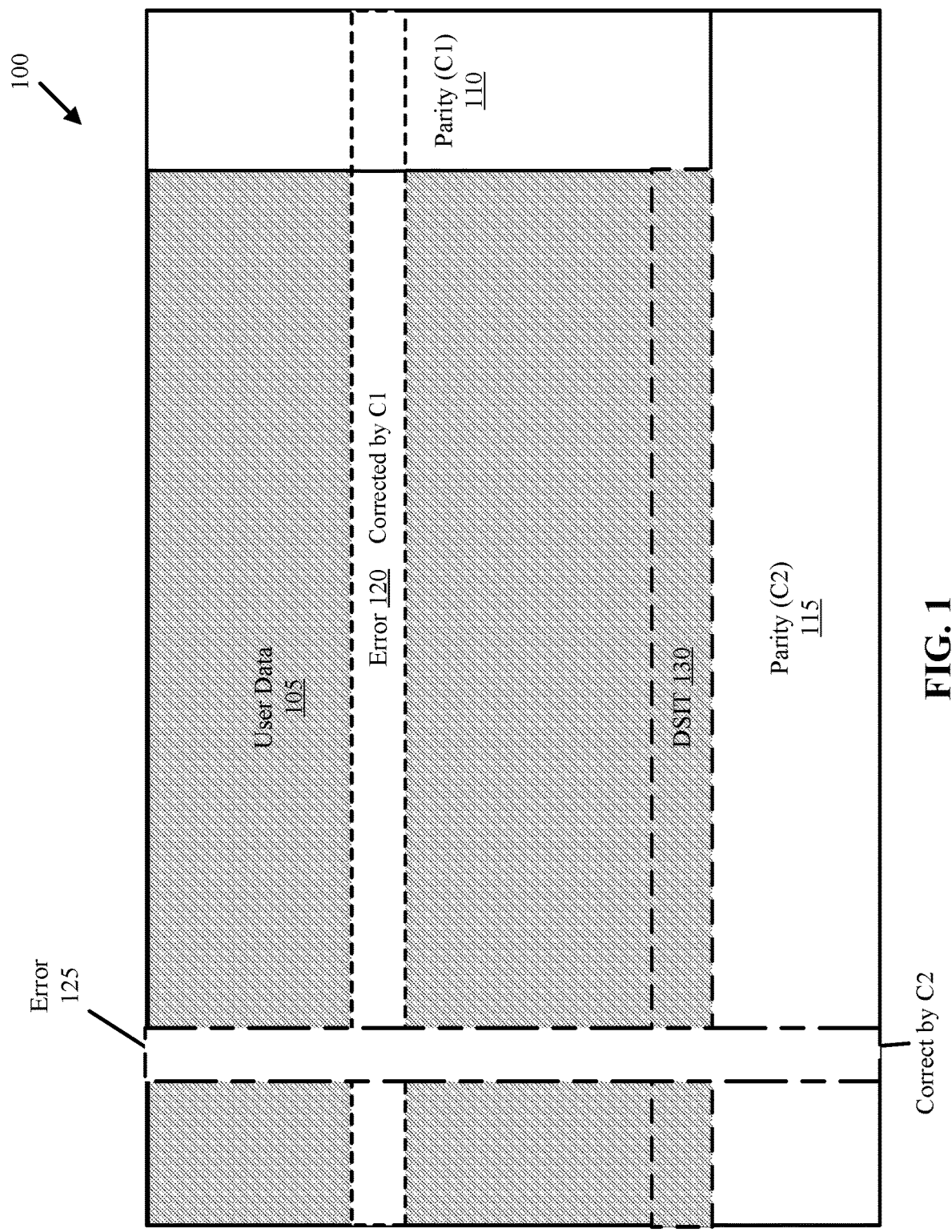
FIG. 1 is a block diagram illustrating an example sub dataset that can be read from a tape medium, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of tape storage, and more particularly to locating data within tape systems. While the present disclosure is not necessarily limited to such applications, various aspects of the disclosure may be appreciated through a discussion of various examples using this context.

Repositioning is a process in which a tape is wound to a target data position (e.g., a target block, record, or file mark (FM)) such that data can be written to or read from the tape starting at the target data position. In order for the tape to be repositioned to the target data position, a request to reposition is made with a record number or file mark (a partition of a file composed of many records) number indicating where the tape should be repositioned. The tape system then references a tape directory to find the target record and/or file mark (target data position). The tape directory utilizes a physical mapping of areas on the tape to record/file mark numbers to reposition the tape to the correct physical area on the tape. For example, a tape can have 272 wraps and each wrap can have 128 areas (or 272×128=34,816 total areas on the tape). Each area can be associated with a last record number and/or file mark number. In response to a repositioning request, the area including the target record number or file mark can be identified as the physical location for repositioning. Upon repositioning to the correct area, datasets within the area can be read sequentially from the beginning until the target record or file mark is found. If the target record or file mark is found, then repositioning ends. However, if the target record or file mark is not found, the remaining area is continued to be read until the target record or file mark is found.

In some instances, if a target dataset cannot be read (e.g., due to repeated use of the tape medium, impurities adhering to the tape surface, deterioration due to corrosion, etc.), the tape drive may change settings (e.g., servo settings, channel settings, dataflow settings, etc.) and repeatedly re-read the same dataset to attempt to find the record and file mark range of the dataset. This process is known as an error recovery procedure (ERP). A single ERP re-read on a dataset can take approximately 3-5 seconds. However, not being able to locate a target data position is a critical issue, and as a result, the tape drive can repeat the ERP re-read 80 or more times to attempt to read a dataset successfully. If the target position cannot be found, the ERP will eventually return an error, or alternatively, the command will time out on the host side. Accordingly, complications exist where target data positions (e.g., records, file marks, and blocks) cannot be accurately located. Additionally, issues exist where error recovery procedures run for prolonged periods (e.g., over 20 minutes) to attempt locate the target data position.

To address the above, cut and paste segments can be used to determine whether a target data position exists among datasets. Cut and paste segments can be generated by combining C1 error correcting code (ECC) data from datasets during ERP reads (e.g., see FIG. 2 for more detail). When the target data position exists among multiple data sets in cut and paste segments, the tape drive narrows down to the dataset which includes the target data position. If a dataset information table (DSIT) of the dataset which is identified can be read successfully, the tape drive identifies the target data position based on data (e.g., file mark or record ranges) within the DSIT. If the DSIT of the identified dataset cannot be read, but DSIT's of preceding and subsequent datasets can be read, the tape drive can identify that the dataset between the preceding and subsequent datasets includes the target data position. Conversely, if the target data position (e.g., target record) does not exist among datasets within the cut and paste segments, the tape drive can begin reading subsequent datasets (within the cut and paste segments) to read corresponding DSIT's to identify the target data position. Using this mechanism, the tape drive can identify a target data position despite not being able to read each dataset and/or DSIT due to poor tape condition and/or bad tape drive condition. This can significantly reduce repositioning time. FIG. 3 illustrates an example method for repositioning using cut and paste segments, as discussed above.

Suspended append write (SAW) is a method for appending new data onto a tape medium. In most cases, SAW overwrites old data on the same dataset (e.g., at the beginning of the dataset) and a write pass (WP) counter is updated (e.g., within headers of CWI-4s of the dataset) to indicate that the data of the dataset has been overwritten. Thus, only data associated with the new WP counter will be read in future requests. However, if the dataset cannot be read due to poor tape condition, SAW is not able to overwrite the dataset at the beginning of the dataset on the tape medium. Rather, SAW is required to adjust the writing head position to a subsequent position (e.g., a subsequent dataset) and write the updated data of the dataset to the adjusted position. To account for this, the tape drive records information indicating that the updated dataset data did not start from the beginning of the overwritten dataset into non-volatile cartridge memory (CM).

To avoid reading overwritten datasets with outdated WP counters, the tape drive can be configured to read the CM to determine that only data associated with an updated WP counter should be read (e.g., despite the outdated/overwritten dataset data preceding the updated position on the tape medium). As such, upon successfully reading any given dataset during a repositioning request, the tape drive can be configured to check the CM to determine whether the next dataset has been updated by SAW. If the next dataset has been determined to have been updated by SAW, then the tape repositions to the updated dataset associated with the SAW, despite the overwritten data potentially being written before the updated SAW dataset.

However, situations can occur where overwritten data (e.g., outdated data) is returned upon a repositioning request. For example, if a repositioning request specifying a target data position is issued, and DSITs of cut and paste segments are relied upon to identify the target data position (e.g., per FIG. 3), if an updated dataset (e.g., with WP #k+1) is positioned subsequent to the overwritten dataset (e.g., with WP #k), the tape drive can mistakenly determine the target data position using the DSIT of the overwritten dataset (e.g., with the outdated WP #k) due to it being prior to the new dataset on the tape media (e.g., the tape drive does not identify that the dataset was overwritten using SAW). This can lead to outdated data being returned in response to the repositioning request. As another example, if only old datasets can be read (e.g., due to bad servo condition), the tape drive can similarly return an outdated target data position (e.g., an outdated target record) to the host based on DSIT information read from overwritten data.

Thus, aspects of the present disclosure recognize that identifying a target data position using DSITs (e.g., of cut and paste segments) may not work in every situation. For example, identifying a target data position using DSITs may not work when the updated dataset is not written to the beginning of the overwritten dataset to which it corresponds and/or due to new data associated with an updated WP being unreadable.

The following description provides examples of embodiments of the present disclosure, and variations and substitutions may be made in other embodiments. Several examples will now be provided to further clarify various aspects of the present disclosure.

Example 1: A computer-implemented method, where the method comprises storing, within a dataset information table (DSIT) of a dataset on a tape medium, information associated with at least one preceding dataset on the tape medium. The method further comprises receiving a repositioning request specifying a target data position. The method further comprises referencing the information associated with the at least one preceding dataset within the DSIT of the dataset while attempting to complete the repositioning request. The above limitations advantageously reduce repositioning time within tape systems by referring to a DSIT including information associated with a preceding dataset. Further, the above limitations reduce errors made by inadvertently reading outdated data within a tape system by referring to the DSIT including information associated with a preceding dataset. Thus, aspects of the present disclosure improve tape system repositioning speed and accuracy.

Example 2: The limitations of Example 1, where the information associated with the at least one preceding dataset includes at least one selected from a group consisting of: a write pass (WP) counter, a record number, a file mark (FM) number, a record number range, and a file mark (FM) range. The above limitations advantageously improve tape repositioning speed and accuracy. For example, by referring to information such as the write pass (WP) counter, record number, file mark (FM) number, record number range, and/or file mark (FM) range of a preceding dataset, a tape drive can accurately satisfy repositioning requests with reduced error frequency.

Example 3: The limitations of any of Examples 1-2, where information associated with multiple respective preceding datasets are stored within the DSIT of the dataset. The above limitations advantageously improve tape repositioning speed and accuracy. For example, by storing information associated with multiple preceding datasets, more data can be referenced to ensure that outdated data is not inadvertently read, thereby increasing repositioning speed/accuracy.

Example 4: The limitations of Example 3, where the number of preceding datasets is based on a number of cut and paste multi segments. The above limitations advantageously improve tape repositioning speed and accuracy. For example, by including information associated with preceding datasets associated with cut and paste multi segments, valid data (e.g., verified by ERP) can be assumed to be referenced. This improves the accuracy and speed of tape system repositioning.

Example 5: The limitations of any of Examples 1-4, where the information associated with the at least one preceding dataset within the DSIT of the dataset is referenced in response to determining that the at least one preceding dataset is unreadable while attempting to complete the repositioning request. The above limitations advantageously improve tape repositioning speed and accuracy. For example, by referencing information within DSIT of a subsequent dataset in response to determining a preceding dataset is unreadable, information associated with the preceding dataset can be ascertained despite it being unreadable.

Example 6: The limitations of any of Examples 1-5, where the tape medium includes an updated dataset corresponding to the dataset stored subsequent to the dataset that was written using suspended append write (SAW), the updated dataset having an updated WP counter. The above limitations advantageously improve tape repositioning speed and accuracy. For example, implementing a DSIT including information associated with a preceding dataset can prevent reading outdated data that has been updated using SAW.

Example 7: The limitations of any of Examples 1-6, where the method further comprises determining that the target data position is not located within the at least one preceding dataset based on the information associated with the at least one preceding dataset within the DSIT of the dataset, inspecting a cartridge memory (CM), ascertaining, based on inspecting the CM, that the updated dataset corresponding to the dataset is stored subsequent to the dataset, and attempting to complete the repositioning request by reading the updated dataset subsequent to the dataset. The above limitations advantageously improve tape repositioning speed and accuracy. For example, implementing a DSIT including information associated with a preceding dataset can prevent reading outdated data that has been updated using SAW. Inspecting the CM to determining that the updated dataset is stored subsequent to the dataset can prevent reading the outdated dataset.

Example 8: A system comprising a tape system having a tape medium, one or more processors, and one or more computer-readable storage media collectively storing program instructions which, when executed by the one or more processors, are configured to cause the one or more processors to perform a method according to any one of Examples 1-7. The above limitations advantageously enable a system comprising one or more processors to perform and realize the advantages described with respect to Examples 1-7.

Example 9: A computer program product comprising one or more computer readable storage media, and program instructions collectively stored on the one or more computer readable storage media, the program instructions comprising instructions configured to cause one or more processors to perform a method according to any one of Examples 1-7. The above limitations advantageously enable a computer program product having program instructions configured to cause one or more processors to perform and realize the advantages described with respect to Examples 1-7.

Example 10: A computer-implemented method comprising storing, within a dataset information table (DSIT) of a dataset on a tape medium, a write pass (WP) counter and a record number respectively associated with a plurality of preceding datasets, where a number of the plurality of preceding datasets are based on a number of cut and paste multi segments. The method further comprises receiving a repositioning request specifying a target data position. The method further comprises referencing either a specific write pass (WP) counter or a specific record number associated with a specific preceding dataset of the plurality of datasets within the DSIT of the dataset while attempting to complete the repositioning request. The above limitations advantageously reduce repositioning time within tape systems. The above limitations realize the benefits of Examples 1-4.

Aspects of the present disclosure can be implemented in the technical use case of linear tape file systems (LTFS) implementing error recovery procedures (ERP).

Referring now to FIG. 1, shown is a sub dataset 100 structure, in accordance with embodiments of the present disclosure. The sub dataset 100 includes user data 105, a first parity 110 (C1), and a second parity 115 (C2). A dataset (not shown) is made up of 64 sub datasets.

The user data 105 (e.g., the gray shaded area including the portion of error 120 and error 125 within user data 105) can include one or more records including data (in a compressed/encrypted form). The tape drive writes/reads data to the tape in datasets. The first parity 110 and second parity 115 contain error correcting code (ECC) corresponding to the user data 105. This can allow the data of the sub dataset 100 to be corrected if any corruptions or errors are associated with the user data 105. In embodiments, upon writing each line of user data 105 horizontally, parity 110 (C1) data (e.g., redundant data) is appended to the end of each row. Thereafter, upon writing each row of data, parity 115 (C2) is added for each completed column of user data 105 written.

In embodiments, the first parity 110, C1, corrects errors of the user data per row of data (e.g., horizontally). For example, a first error 120 associated with a row of user data 105 may be fixed/corrected by a corresponding horizontal row of the first parity 110. Similarly, the second parity 115 can be configured to correct errors occurring per column of the user data 105. For example, a second error 125 associated with a column of user data can be fixed/corrected by a corresponding vertical column of the second parity 115.

Upon correcting errors associated with the rows and columns via the first parity 110 and second parity 115, respectively, the user data 105 can be assumed to be valid and the records of the sub dataset 100 can be transferred to a host.

The sub dataset 100 can be any suitable size. In embodiments, the sub dataset 100 size is fixed based on defined standards (e.g., in a format specification, such as the International Organization for Standardization (ISO)). In embodiments, the sub dataset 100 size is fixed based on the format specification generation. The size of the sub dataset 100 may vary based upon the format specification generation. In embodiments, the sub dataset 100 is logically organized into a two-dimensional array, as shown in FIG. 1. As an example, the user data 105 may contain a first number of bytes horizontally (e.g., 924) and a first number of bytes vertically (e.g., 168) (924×168 bytes), the first parity 110 may contain a second number of bytes horizontally (e.g., 48) and a second number of bytes vertically (e.g., 192) (48×192 bytes), and the second parity 115 may contain a third number of bytes horizontally (e.g., 960) and a third number of bytes vertically (e.g., 24) (972×24 bytes), (e.g., amounting to a 972×216 dataset). However, any suitable size or structure of sub dataset 100 can be implemented. In embodiments, the size of the sub dataset 100 can be lesser or greater than the examples provided.

Each row of the two-dimensional array (e.g., 972 bytes horizontally) that makes up the sub dataset 100 is referred to as a 4-way codeword interleave (CWI-4). Thus, each sub dataset 100 can include 192 CWI-4's, each with a respective header (e.g., the header portion is broken down into 192 12 byte headers for each CWI-4). In tape systems, CWI-4 rows can be written from tape heads in parallel. In embodiments, a write pass (WP) counter is indicated within a header of each CWI-4. However, as discussed above, the number of CWI-4's included in sub dataset 100 can vary depending on the size of the sub dataset 100 (e.g., the number of rows within the sub dataset 100).

As shown in FIG. 1, the last row (e.g., the last CWI-4) of the user data 105 within the sub dataset 100 includes a dataset information table (DSIT) 130. In embodiments, only the last sub dataset (e.g., the $64^{th}$ sub dataset, where a dataset is comprises 64 sub datasets) of a given dataset includes a DSIT. Various information relating to the dataset which includes the sub dataset 100 is recorded in the DSIT 130. For example, the DSIT 130 can include the range of record numbers and file marks included in the dataset. This can be used during a repositioning request such that, when an area of the tape including a target data position is identified, DSIT 130 information from each dataset can be read to ascertain the presence of the target data position by referencing the record and file mark ranges indicated in the DSIT 130.

In embodiments of the present disclosure, the DSIT 130 of sub dataset 100 can include information associated with preceding datasets. In particular, the DSIT 130 of the sub dataset 100 can include information such as the WP counter, record number (e.g., a last or first record number included in the preceding dataset), FM number (e.g., a last or first record file mark included in the preceding dataset), record number range, FM number range, a total number of records (e.g., 500 total records), and/or a total number of FM's (e.g., 500 total FM's) of preceding datasets. The number of preceding datasets can vary. For example, the sub dataset 100 can include WP counter, record number, FM number, record number range, FM number range total number of records, and/or a total number of FM of each of the previous x datasets, where x is an integer that can vary based on the size of the DSIT 130 (e.g., and the overall size of the sub dataset 100). In embodiments, the size of x can depend on the number of datasets included in cut and paste segments. As an example, x can be the last 15, 31, or 47 datasets (e.g., including the current dataset, this would amount to 16, 32, or 48 datasets to be included in cut and paste multi segments, thus, x can equal n−m+1, where n is the number of the current dataset and m is the number of cut and paste multi segments, see FIG. 4).

Thus, the DSIT 130 of sub dataset 100 can include information such as WP counter, record number, FM number, record number range, FM number range, total number of records, and/or a total number of FM's of preceding datasets (e.g., datasets that include earlier record/FM numbers that are upstream the sub dataset 100 on the tape medium). This can be used to improve repositioning of the tape system in instances where one or more preceding datasets are unreadable. For example, the DSIT 130 containing information of preceding datasets can be referenced to determine information such as WP of preceding datasets, record number of preceding datasets, FM number in preceding datasets, record number range within preceding datasets, FM number range of preceding datasets, total number of records in preceding datasets, and/or a total number of FM's in preceding datasets.

Figure 2:
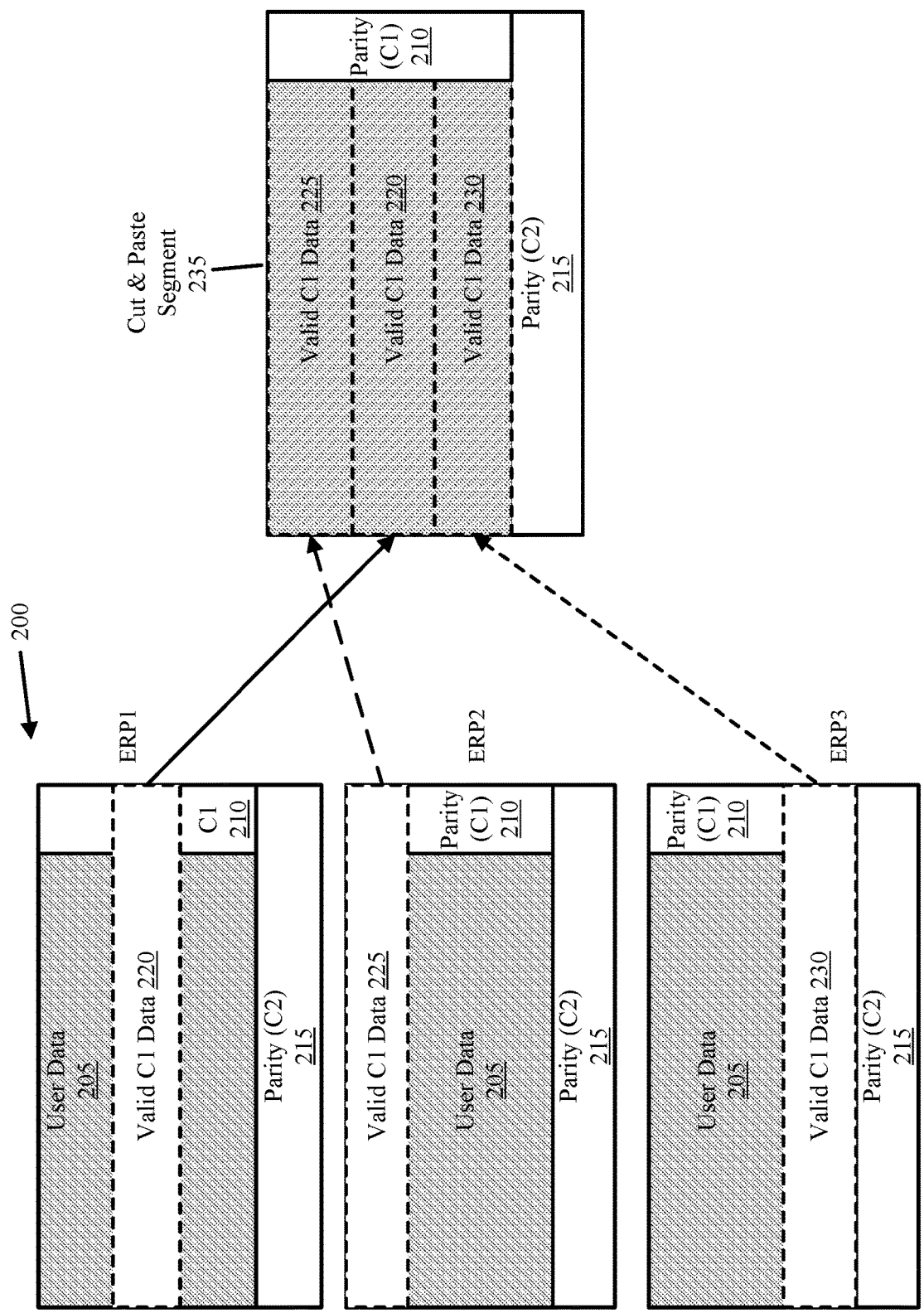
FIG. 2 is a block diagram illustrating a method for generating a cut and paste segment based on a dataset, in accordance with embodiments of the present disclosure.
Figure 3:
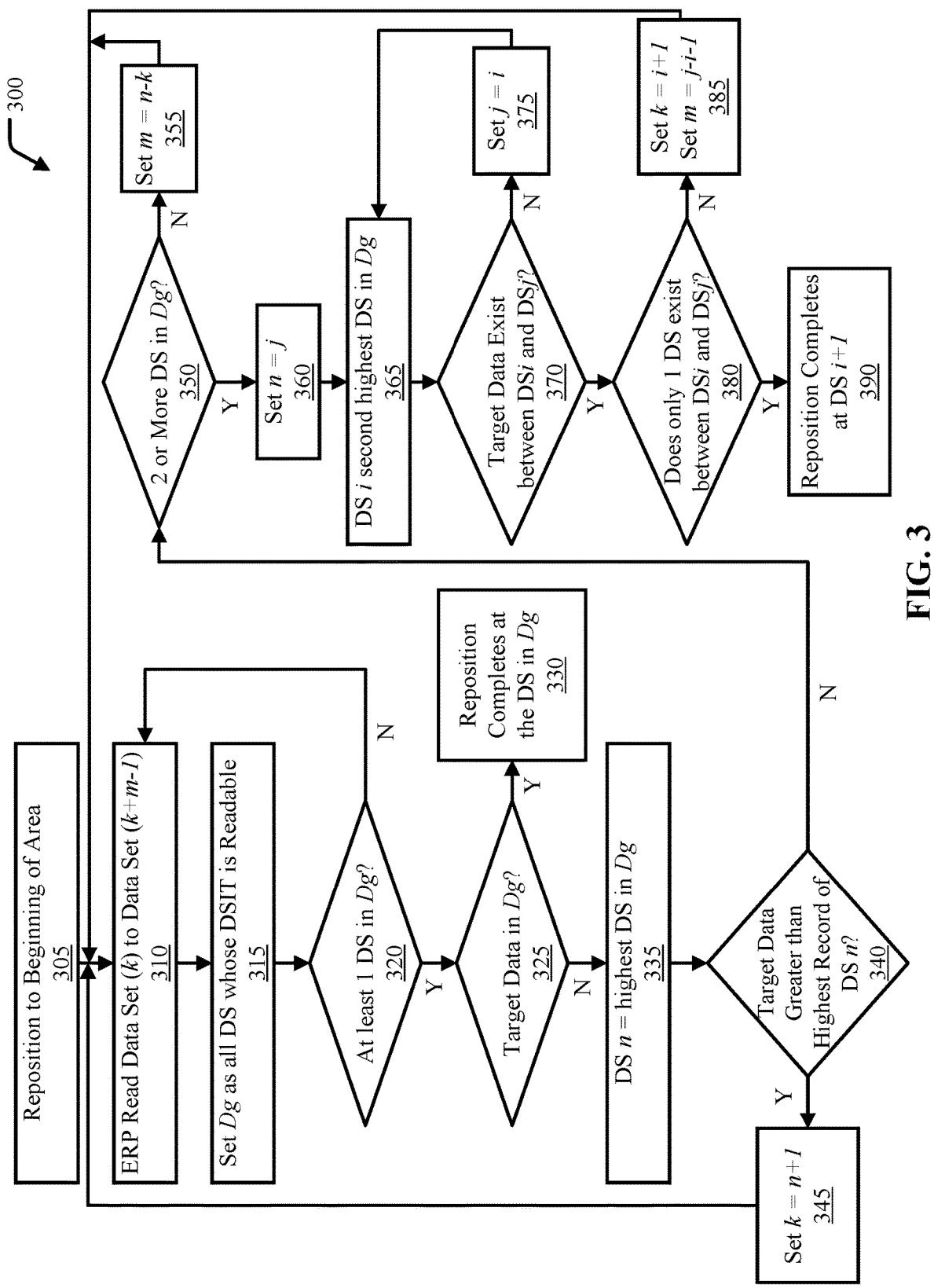
FIG. 3 is a flow-diagram illustrating an example method for repositioning using cut and paste segments, in accordance with embodiments of the present disclosure.

Referring now to FIG. 2, shown is a diagram depicting the formation of a cut and paste segment 235 based on multiple error recovery procedure (ERP) scans, in accordance with embodiments of the present disclosure.

As shown in FIG. 2, a sub dataset 200 is depicted with user data 205, C1 parity 210, and C2 parity 215. As discussed with respect to FIG. 1, the C1 parity 210 can be configured to correct errors within rows of the user data 205 (horizontally) and the C2 parity 215 can be configured to correct errors within columns of the user data 205 (vertically).

Within an ERP process, C1 parity 210 and C2 parity 215 can be used to determine whether data is valid or not (e.g., readable). Within the ERP process, if an error is not detected as a result of making corrections within the data (e.g., a data row or column), then that data including the C1 data and C2 data can be copied to a dedicated segment reserved on a memory buffer.

As shown in FIG. 2, a first ERP scan (ERP 1) is completed on the sub dataset 200 and valid C1 data 220 determined by the first ERP scan is copied from the sub dataset 200 to a cut and paste segment 235. That is, the entire sub dataset 200 is read during the first ERP scan and data which is determined to be valid based on C1 is copied to cut and paste segment 235. In embodiments, data may be copied from the sub dataset 200 to the cut and paste segment 235 row by row, based on the rows of the valid C1 data 220. However, after the first ERP scan, the sub dataset 200 is still not readable, as there were unreadable areas within the sub dataset 200. Thus, a second ERP scan (ERP 2) is completed on the sub dataset 200 by rewinding the tape to the beginning of the sub dataset 200 and re-reading it as a part of the second ERP scan. During the second ERP scan, valid C1 data 225 determined by the second ERP scan is copied from the sub dataset 200 to the cut and paste segment 235. However, after the second ERP scan, the sub dataset 200 is still not readable in its entirety. As such, a third ERP scan is completed on the sub dataset 200 (e.g., by rewinding the tape to the beginning of the sub dataset 200 and re-reading) and valid C1 data 230 determined by the third ERP scan is copied from the sub dataset 200 to the cut and paste segment 235. This can be completed for all rows within the dataset 200 until the dataset 200 can be read. For example, a plurality of rows (hundreds, depending on the number of rows within the dataset) can be copied into the cut and paste segment 235.

Upon generating the cut and paste segment comprising a plurality of rows of C1 data, the data comprising the cut and paste segment can be copied to the dedicated segment reserved on the memory buffer. Thereafter, C2 data can be referenced against the valid C1 rows within the dedicated segment to verify the accuracy of columns. Upon verifying the accuracy of columns using C2 data, the ERP process completes.

In embodiments, ERP can be performed simultaneously on multiple datasets (e.g., and respective sub datasets) to generate multiple cut and paste segments of respective datasets. For example, 16 or 32 cut and paste segments can be simultaneously generated from 16 or 32 consecutive datasets during an ERP process. Forming multiple cut and paste segments simultaneously (e.g., at the same time or within a small window) is hereinafter referred to as "cut and paste multi." In embodiments, a cut and paste multi can include cut and paste segments of a plurality of datasets which have been verified via ECC. For example, a cut and paste multi can include 16, 32, or 48 cut and paste segments of 16, 32, or 48 respective datasets.

Referring now to FIG. 3, shown is a flow-diagram illustrating an example method 300 for repositioning to a target data position using cut and paste segments, in accordance with embodiments of the present disclosure.

Method 300 initiates at operation 305, where a request to reposition to a target data position is received and the tape medium is repositioned to the beginning of the area containing the target data position. The request to reposition can specify a target record, file mark, or block for which a read or write operation is directed to. The tape drive can then wind the tape to the beginning of the target area (e.g., a predetermined region of a wrap, depending on the tape directory used). In embodiments, the target area for repositioning can be half of a wrap (e.g., if a normal tape directory is used). In embodiments, the target area for repositioning can be a smaller subsection of a wrap (e.g., $\frac{1}{128}^{th}$ of a wrap, as used in high resolution tape directory (HRTD) designs). In embodiments, the beginning of the area which the tape is repositioned to is assumed to include a dataset containing the target data position (e.g., target record).

Method 300 proceeds to operation 310, where reading, as a part of an error recovery procedure (ERP), is completed from a dataset k (e.g., a first dataset at the beginning of the area which the tape is repositioned to) to a dataset k+m−1 (e.g., a later dataset within the area, depending on the number of cut and paste multi segments generated), where m is a total number of datasets which cut and paste multi segments are generated for (e.g., 16 or 32). That is, a total number "m" of datasets for which corrections were made (e.g., using C1 and C2) and for which cut and paste segments are generated are read within the area. Thus, reading as a part of an ERP cut and paste multi operation is completed from a first dataset of the area to an $m^{th}$ dataset of the area, where m depends on the number of cut and paste multi datasets.

A group (e.g., subset) of datasets whose dataset information table (DSIT) is readable in the cut and paste segments, Dg, is then determined. This is illustrated at operation 315. As discussed with respect to FIG. 1, the DSIT is located at the last line of the data within each dataset. Therefore, all datasets having a readable DSIT within a range from dataset k (e.g., a first data set) to dataset k+m−1 (an $m^{th}$ dataset) are included within Dg.

A determination is then made whether there is at least one dataset within Dg. This is illustrated at operation 320. If there is not at least one dataset within Dg, then method 300 returns to operation 310 where ERP readings of datasets within the area can continue to be completed until a dataset having readable DSIT information is identified.

If there is at least one dataset included in Dg, then a determination is made whether the target data for which the repositioning request (e.g., at operation 305) was directed to is included in Dg. This is illustrated at operation 325. As discussed above, if there is at least one dataset whose DSIT is readable within Dg, then a range of records and/or file marks can be obtained by analyzing the DSIT. As such, by reading the DSIT of the at least one dataset within Dg, a determination can be made whether the target data is within Dg.

If a determination is made that the target data is present within Dg, then repositioning completes at the dataset within Dg for which the target data is included. This is illustrated at operation 330. That is, the target for repositioning can be a dataset within Dg having readable DSIT information that is determined to include the target data position (e.g., target record) based on reading the DSIT information.

If a determination is made that the target data is not within Dg (e.g., reading DSIT information for datasets within Dg indicates that the target data is not within record ranges/file mark ranges indicated by the DSIT(s)), then the highest number dataset within Dg is set to n (e.g., "DS n"), where k≤n≤k+m−1. This is illustrated at operation 335. Thus, the highest number dataset within Dg, DS n, is between the dataset range read during ERP at operation 310.

A determination is then made whether the target data position is greater than the highest record number of DS n (e.g., given that DS n is the highest dataset within Dg, DS n is the highest dataset between dataset k and dataset k+m−1 having readable DSIT information). This is illustrated at operation 340. If a determination is made that the target data position is greater than the highest record indicated within DSIT of DS n, then in operation 345 k is set to n+1. Thereafter, operation 310 is recompleted with k set to n+1 (e.g., the next dataset after DS n is read until dataset n+m). That is, ERP readings occurs from a next data set after the DS n, DS n+1, until a dataset (n+m), DS n+m.

If a determination is made that the target data position is not greater than the highest record indicated within DSIT of DS n, then a determination is made whether there are two or more datasets within Dg. This is illustrated at operation 350. If a determination is made that there is not two or more datasets within Dg (e.g., there is only a single dataset within Dg), then m is set to n−k. This is illustrated at operation 355. Thus, if there is only a single dataset within Dg and the target data position is greater than the highest record of that dataset, ERP reading at operation 310 is recompleted from dataset k, DS k, to dataset (n−1), DS n−1.

If a determination is made that there is more than two datasets included within Dg, then the highest dataset DS n is set to j (e.g., the highest dataset having readable DSIT within Dg). This is illustrated at operation 360.

Further, an assumption is made that the second highest dataset within Dg occurring before DS n (i.e., DS j) is DS i. This is illustrated at operation 365. In embodiments, datasets may exist between DS i and DS j, however, they may not be included within Dg. That is, the datasets between DS i and DS j may not have readable DSIT information.

A determination then occurs whether the target data position exists between DS i and DS j (e.g., the second highest and highest datasets within Dg having readable DSIT information). This is illustrated at operation 370. If a determination is made that the target data position does not exist between DS i and DS j, then j is set to i. This is illustrated at operation 375. In other words, the old DS i becomes the new DS j and a next dataset before the old DS i having readable DSIT information is set as the new DS i. Thereafter, a determination can be made whether the target data position exists between the new DS i and DS j. This may repeat until the target data is found to exist between the datasets within Dg.

If a determination is made that the target data does exist between DS i and DS j (e.g., the target data position specified at operation 305 is greater than the record range indicated in the DSIT for DS i and lower than the record range indicated in the DSIT for DS j), then a determination is made whether only a single dataset exists between DS i and DS j. This is illustrated at operation 380.

If a determination is made that more than one dataset exists between DS i and DS j, then k is set to (i+1) and m is set to (j−i−1). This is illustrated at operation 385. Thus, reading as a part of the ERP at operation 310 occurs between dataset i+1, DS i+1, and dataset j−1, DS j−1. As such, datasets in between DS i and DS j are read as a part of the ERP at operation 310.

If a determination is made that only a single dataset exists between DS i and DS j, then repositioning completes at DS i+1 (e.g., the dataset between DS i and DS j). This is illustrated at operation 390. This is because the target record is assumed to exist between the record range indicated in the DSIT for DS i and the record range indicated in the DSIT for DS j.

The aforementioned operations can be completed in any order and are not limited to those described. Additionally, some, all, or none of the aforementioned operations can be completed, while still remaining within the spirit and scope of the present disclosure.

Figure 4:
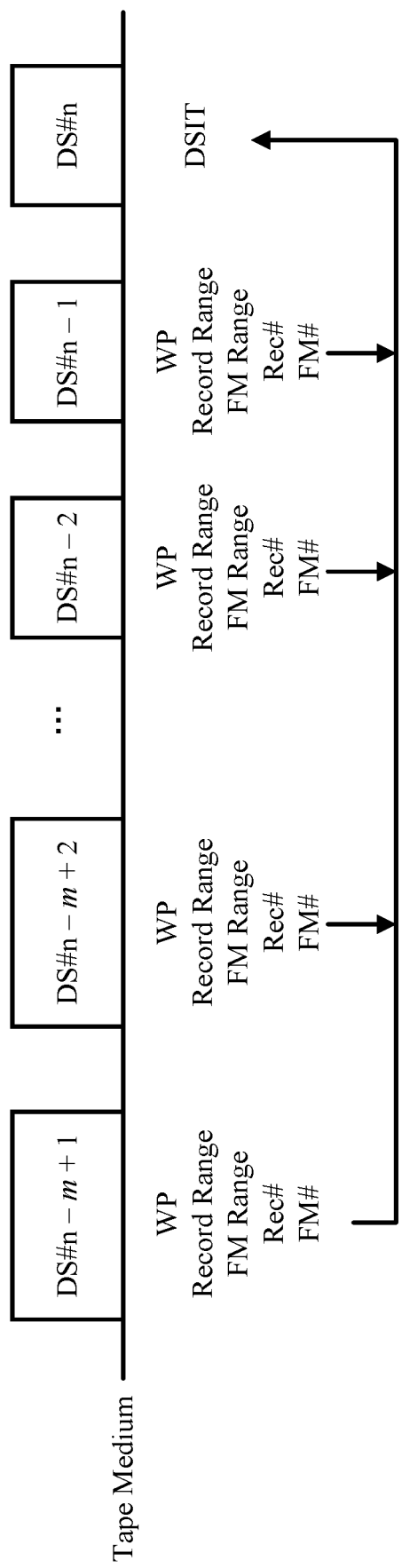
FIG. 4 is a block diagram illustrating example information associated with preceding datasets that can be stored in a dataset information table (DSIT) of a dataset, in accordance with embodiments of the present disclosure.

Referring now to FIG. 4, shown is exemplary information that can be stored within a DSIT of a dataset DS #n. As shown in FIG. 4, information such as WP counter, record number range, FM number range, record number (e.g., a first or last record included in the dataset), FM number (e.g., a first or last record included in the dataset), total record number, and/or total FM number of preceding datasets can be stored within the DSIT of dataset DS #n. In the example depicted in FIG. 4, the number of preceding datasets that have their information recorded in the DSIT of dataset DS #n range from DS #n−m+1 to DSn−1, where m is the total number of datasets included in cut and paste multi operations. Thus, if m is 32 (e.g., 32 datasets corresponding to 32 cut and paste multi segments are included in cut and paste multi), then the preceding 31 datasets have their information recorded in the DSIT of dataset DS #n.

However, in embodiments, any suitable number of datasets can have their information recorded within the DSIT of dataset DS #n. For example, only a single preceding dataset (e.g., DS #n−1) may have its information recorded in the DSIT of dataset DS #n. As another example, in some embodiments, the preceding 15 or 47 datasets may have their information recorded within the DSIT of dataset DS #n (e.g., when m is equal to 16 or 48). In embodiments, the number of preceding datasets which have their information recorded within the DSIT of dataset DS #n can depend on the size of the DSIT. For example smaller sized DSIT's may be limited to recording information associated with a lesser number of preceding datasets, whereas larger sized DSIT's may enable recording information associated with a greater number of preceding datasets. As mentioned above, the size of the DSIT can vary based on the size of the implemented dataset (e.g., and CWI-4s associated therewith). Any suitable number of preceding datasets can have their information recorded within a DSIT without departing from the spirit and scope of the present disclosure.

Figure 5:
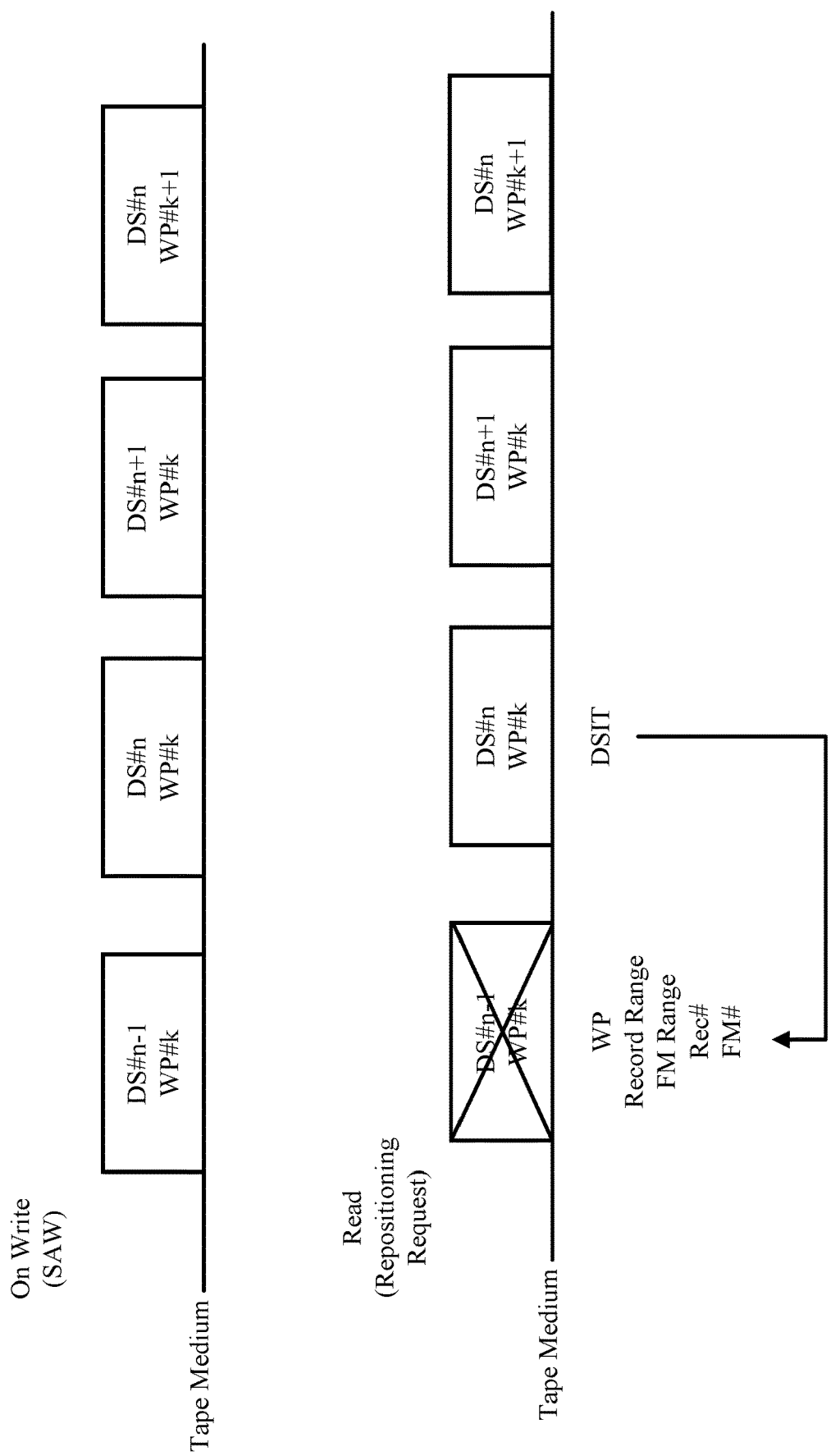
FIG. 5 is a block diagram illustrating an example repositioning use-case when a preceding dataset is unreadable, in accordance with embodiments of the present disclosure.

Referring now to FIG. 5, shown is an example repositioning use-case when a preceding dataset is unreadable, in accordance with embodiments of the present disclosure. As shown in FIG. 5, on write (e.g., SAW), dataset DS #n with WP #k (a first write pass having a first WP counter) is overwritten with DS #n with WP #k+1 (a second write pass having a second WP counter). However, DS #n with WP #k+1 is not written at the beginning of DS #n with WP #k on the tape (e.g., due to poor tape medium or tape drive condition). Thus, the CM of the tape system can be updated to indicate that DS #n having WP #k+1 is written in a position subsequent to DS #n having WP #k.

Assume that on read (e.g., in response to a repositioning request specifying a target data position), DS #n−1 with WP #k is unreadable (e.g., due to poor tape medium condition or bad tape drive condition). As such, because reading occurs sequentially, the tape drive begins attempting to read DS #n−1 with WP #k. However, because the tape drive is unable to read DS #n−1 with WP #k, the tape drive can then be configured to reference the DSIT of DS #n with WP #k. As mentioned above, the DSIT of DS #n with WP #k can include information about preceding datasets. In this instance, the DSIT of DS #n with WP #k includes the WP counter, record range number, FM range number, record number, FM number, total record number, and/or total FM number of the preceding dataset DS #n−1 with WP #k.

Even though DS #n−1 with WP #k is unreadable, the tape drive can verify that the information of the preceding dataset is correct by comparing the DSIT information to header information within DS #n−1 with WP #k. This can be completed despite DS #n−1 with WP #k being unreadable as header information within each respective CWI-4 of DS #n−1 with WP #k includes a WP counter. As such, it is likely that at least one CWI-4 (row of data) within DS #n−1 with WP #k is readable (and thus can be used to verify that the information within DSIT is correct). Thus, if the WP counter recorded in the DSIT of DS #n with WP #k corresponding to DS #n−1 with WP #k matches the WP counter recorded a header of a CWI-4 of DS #n−1 with WP #k, then the tape drive can assume that the information within the DSIT directed to DS #n−1 with WP #k is correct.

In this example, the tape drive can determine that the target record is not included in DS #n'1 with WP #k. Thus, upon successfully reading DS #n−1 with WP #k, the tape drive can check the CM to determine that DS #n with WP #k has been subjected to SAW and thus is outdated. Accordingly, the tape drive recognizes that DS #n with WP #k is outdated and begins reading at DS #n with WP #k+1. This prevents the tape drive from reading the overwritten dataset DS #n with WP #k to attempt to locate the target data position indicated in the repositioning request inadvertently.

Figure 6:
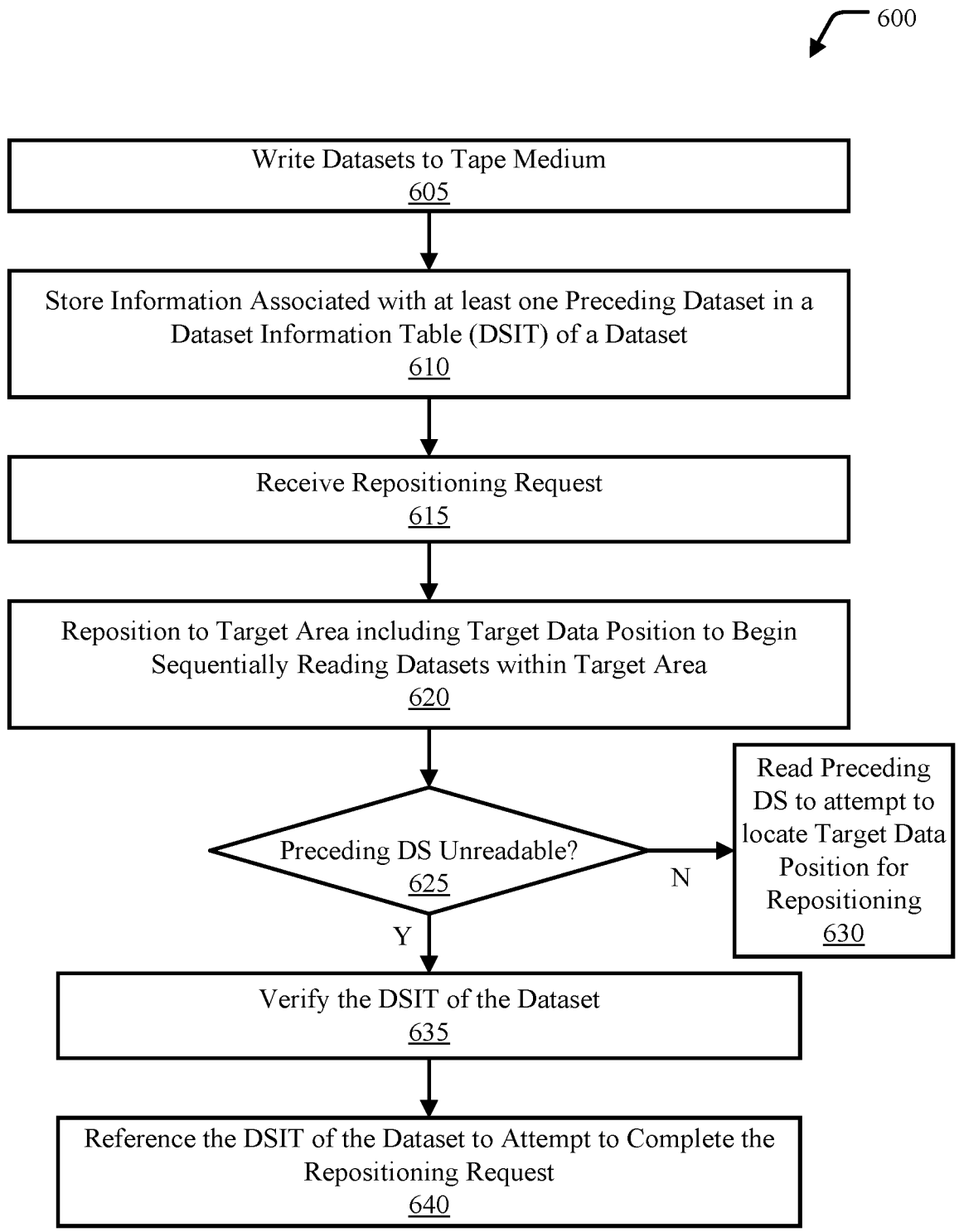
FIG. 6 is a flow-diagram illustrating an example method for improved repositioning of a tape drive using a DSIT storing information associated with preceding datasets, in accordance with embodiments of the present disclosure.

Referring now to FIG. 6, shown is a flow-diagram illustrating an example method 600 for improved repositioning of a tape drive using a DSIT storing information associated with preceding datasets, in accordance with embodiments of the present disclosure.

Method 600 initiates at operation 605, where datasets are written to a tape medium. Each dataset can comprise of 64 sub datasets (e.g., sub dataset 100 depicted in FIG. 1). Thus, each dataset can include a plurality of sub datasets including user data, C1 parity, C2 parity, and a DSIT (e.g., for the last sub dataset within the dataset).

Information associated with at least one preceding dataset can be stored in the DSIT of a dataset. This is illustrated at operation 610. In embodiments, each DSIT of each dataset can include information associated with at least one preceding dataset. In embodiments, the information associated with the at least one preceding dataset can include a WP counter, record number range, FM number range, record number, FM number, total record number, and/or total FM number of the at least one preceding dataset. In embodiments, the number of preceding datasets that have their information recorded within the DSIT of the dataset can vary (e.g., based on the number of cut and paste multi segments, based on the size of the dataset, etc.).

A repositioning request is received. This is illustrated at operation 615. The repositioning request can specify a target data position for repositioning (e.g., a target record or FM number).

The tape drive then repositions to the target area including the target data position to begin reading datasets sequentially within the target area to attempt to locate the target data position. This is illustrated at operation 620. For example, the tape drive can reference a tape directory to identify the target area that the tape medium should be wound to in order to locate the target record.

A determination is made whether a preceding dataset (e.g., DS #n−1) is unreadable. This is illustrated at operation 625. If the preceding dataset is not unreadable, the tape drive reads the preceding dataset to attempt to locate the target data position. This is illustrated at operation 630.

If the preceding dataset is unreadable, the DSIT of the dataset (e.g., DS #n) is verified. This is illustrated at operation 635. The DSIT of the dataset can be verified by comparing the information within the DSIT (e.g., a WP counter of the preceding dataset) to a header of a CWI-4 of the preceding dataset. That is, a WP counter of the preceding dataset within the DSIT can be compared to a WP counter within a header of a CWI-4 within the preceding dataset.

The DSIT of the dataset is then referenced to attempt to complete the repositioning request. This is illustrated at operation 640. For example, referencing the DSIT to attempt to complete the repositioning request can include determining whether the target data position is within one or more preceding datasets based on the record number ranges, FM number ranges, WP counters, record numbers, FM numbers, total record numbers, and/or total FM numbers within the preceding datasets. This can reduce the time required for repositioning. This can further prevent errors associated with repositioning requests where outdated data is returned in response to the repositioning request.

The aforementioned operations can be completed in any order and are not limited to those described. Additionally, some, all, or none of the aforementioned operations can be completed, while still remaining within the spirit and scope of the present disclosure.

Figure 7:
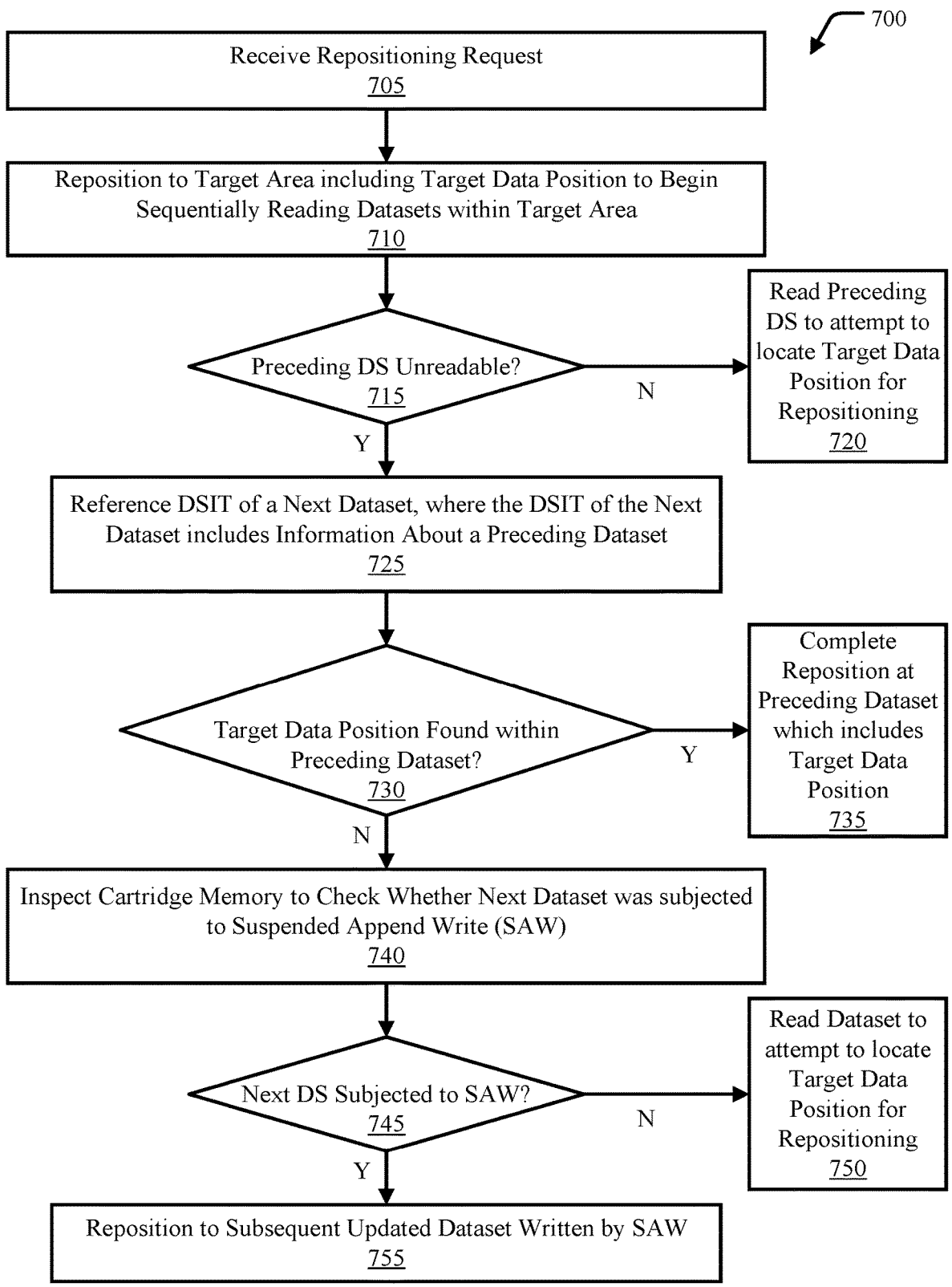
FIG. 7 is a flow-diagram illustrating another example method for improved repositioning of a tape driving using a DSIT storing information associated with preceding datasets, in accordance with embodiments of the present disclosure.

Referring now to FIG. 7, shown is a flow-diagram illustrating an example method 700 for improved repositioning of a tape drive using a DSIT storing information associated with preceding datasets, in accordance with embodiments of the present disclosure.

Method 700 initiates at operation 705, where repositioning request is received. The repositioning request can specify a target data position for repositioning (e.g., a target record or FM number).

The tape drive then repositions to the target area including the target data position to begin reading datasets sequentially within the target area to attempt to locate the target data position. This is illustrated at operation 710. For example, the tape drive can reference a tape directory to identify the target area that the tape medium should be wound to in order to locate the target record.

A determination is made whether a preceding dataset (e.g., DS #n−1) is unreadable. This is illustrated at operation 715. If the preceding dataset is not unreadable, the tape drive reads the preceding dataset to attempt to locate the target data position. This is illustrated at operation 720.

If the preceding dataset is unreadable, the DSIT of a next dataset (e.g., DS #n) is referenced, where the DSIT of the next dataset includes information about a preceding dataset. This is illustrated at operation 725. In embodiments, the information associated with the preceding dataset can include a WP counter, record number range, FM number range, record number, FM number, total record number, and/or total FM number of the preceding dataset. In embodiments, the number of preceding datasets that have their information recorded within the DSIT of the next dataset can vary (e.g., based on the number of cut and paste multi segments, based on the size of the dataset, etc.). In embodiments, the DSIT can be verified via comparison to information within headers of CWI-4s of preceding datasets.

A determination is made whether the target data position is found within the preceding dataset. This is illustrated at operation 730. If the target data position is found within the preceding dataset, then the repositioning is completed at the preceding dataset which includes the target data position. This is illustrated at operation 735.

If a determination is made that the target data position is not found within the preceding dataset, then a cartridge memory (CM) is inspected to check whether the next dataset was subjected to suspended append write (SAW). This is illustrated at operation 740.

A determination is then made whether the next dataset was subjected to SAW. This is illustrated at operation 745. If a determination is made that the next dataset was not subjected to SAW, then the dataset is read to attempt to locate the target data position for repositioning. This is illustrated at operation 750. If a determination is made that the next dataset was subjected to SAW, then the tape drive is repositioned to a subsequent updated dataset written by SAW. This is illustrated at operation 755. This can be completed to attempt to locate the target data position within the updated dataset written by SAW. This can reduce the time for repositioning. This can further reduce errors caused by reading outdated data.

The aforementioned operations can be completed in any order and are not limited to those described. Additionally, some, all, or none of the aforementioned operations can be completed, while still remaining within the spirit and scope of the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
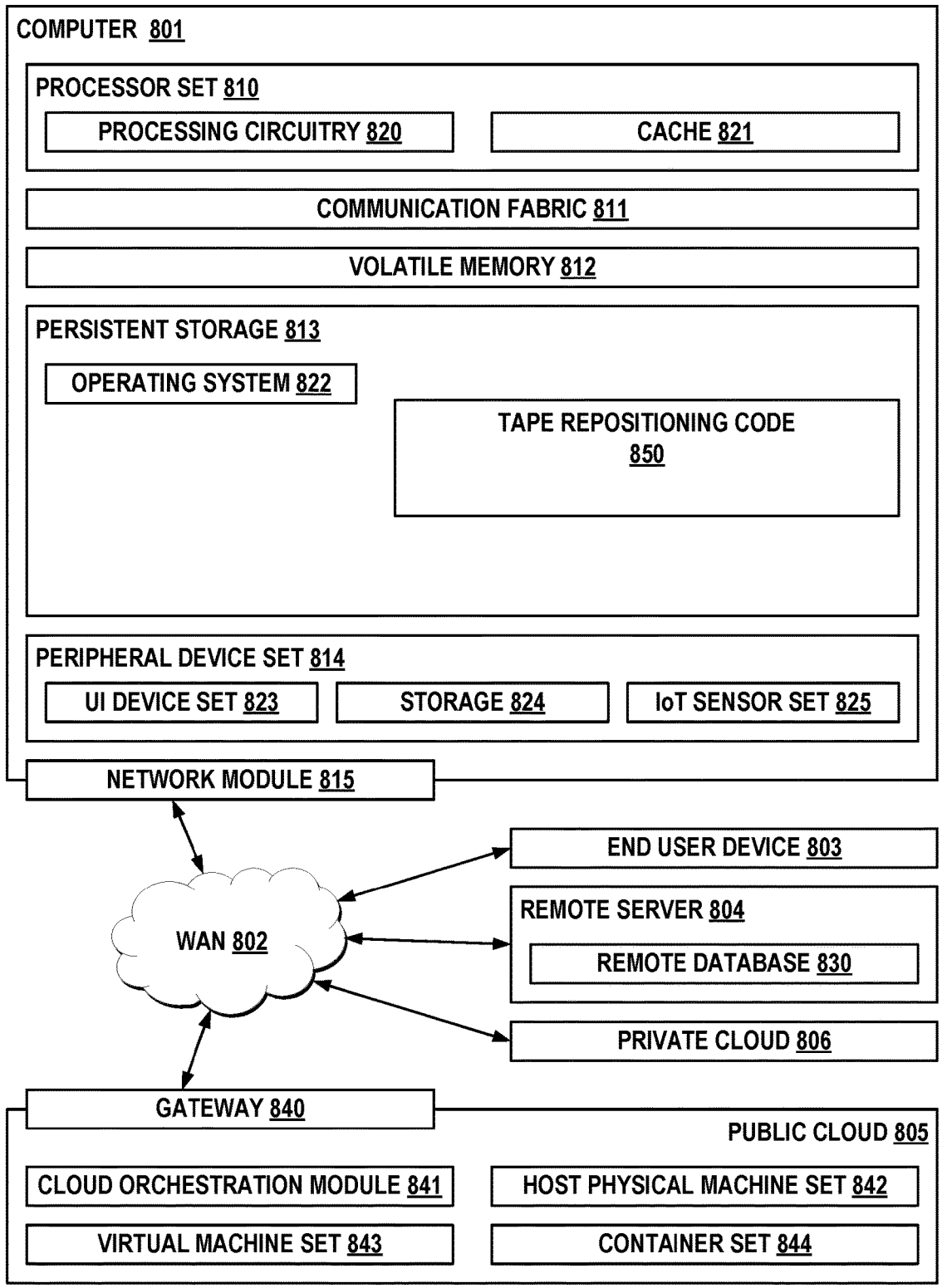
FIG. 8 is a high-level block diagram illustrating an example computer system and network environment that can be used in implementing one or more of the methods, tools, modules, and any related functions described herein, in accordance with embodiments of the present disclosure.

FIG. 8 is a high-level block diagram illustrating an example computing environment 800 that can be used in implementing one or more of the methods, tools, modules, and any related functions described herein, in accordance with embodiments of the present disclosure. Computing environment 800 contains an example of an environment for the execution of at least some of the computer code involved in performing the inventive methods, such as tape repositioning code 850. In addition, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and tape repositioning code 850, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 641, host physical machine set 642, virtual machine set 843, and container set 844.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

Processor set 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some or all of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in tape repositioning code 850 in persistent storage 813.

Communication fabric 811 includes the signal conduction paths that allow the various components of computer 801 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 812 is any type of volatile memory now known or to be developed in the future. Examples include dynamic type random access memory (RAM) or static type RAM. Typically, the volatile memory 812 is characterized by random access, but this is not required unless affirmatively indicated. In computer 801, the volatile memory 812 is located in a single package and is internal to computer 801, but, alternatively or additionally, the volatile memory 812 may be distributed over multiple packages and/or located externally with respect to computer 801.

Persistent storage 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in tape repositioning code 850 typically includes at least some of the computer code involved in performing the inventive methods.

Peripheral device set 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, mixed reality (MR) headset, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

Network module 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

Remote server 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

Public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. A method comprising:
    storing, within a dataset information table (DSIT) of a dataset on a tape medium, information associated with at least one preceding dataset on the tape medium, wherein the tape medium includes an updated dataset corresponding to the dataset and stored subsequent to the dataset, the updated dataset written using suspended append write (SAW) and the updated dataset having an updated write pass (WP) counter;
    receiving a repositioning request specifying a target data position; and
    referencing the information associated with the at least one preceding dataset within the DSIT of the dataset while attempting to complete the repositioning request.

2. The method of claim 1, wherein the information associated with the at least one preceding dataset includes at least one selected from a group consisting of: a write pass (WP) counter, a record number, a file mark (FM) number, a record number range, and a file mark (FM) range.

3. The method of claim 1, wherein information associated with multiple respective preceding datasets are stored within the DSIT of the dataset.

4. The method of claim 3, wherein a number of the multiple preceding datasets is based on a number of cut and paste multi segments.

5. The method of claim 1, wherein the information associated with the at least one preceding dataset within the DSIT of the dataset is referenced in response to determining that the at least one preceding dataset is unreadable while attempting to complete the repositioning request.

6. The method of claim 1, further comprising:
    determining that the target data position is not located within the at least one preceding dataset based on the information associated with the at least one preceding dataset within the DSIT of the dataset;
    inspecting a cartridge memory (CM);
    ascertaining, based on inspecting the CM, that the updated dataset corresponding to the dataset is stored subsequent to the dataset; and
    attempting to complete the repositioning request by reading the updated dataset subsequent to the dataset.

7. A system comprising:
    a tape system having a tape medium;
    one or more processors; and
    one or more computer-readable storage media collectively storing program instructions which, when executed by the one or more processors, are configured to cause the one or more processors to perform a method comprising:
    storing, within a dataset information table (DSIT) of a dataset on the tape medium, information associated with at least one preceding dataset on the tape medium, wherein the tape medium includes an updated dataset corresponding to the dataset and stored subsequent to the dataset, the updated dataset being written using suspended append write (SAW) and the updated dataset having an updated write pass (WP) counter;
    receiving a repositioning request specifying a target data position; and
    referencing the information associated with the at least one preceding dataset within the DSIT of the dataset while attempting to complete the repositioning request.

8. The system of claim 7, wherein the information associated with the at least one preceding dataset includes at least one selected from a group consisting of: a write pass counter, a record number, a file mark (FM) number, a record number range, and a file mark range.

9. The system of claim 7, wherein information associated with multiple respective preceding datasets are stored within the DSIT of the dataset.

10. The system of claim 9, wherein a number of the multiple preceding datasets is based on a number of cut and paste multi segments.

11. The system of claim 7, wherein the information associated with the at least one preceding dataset within the DSIT of the dataset is referenced in response to determining that the at least one preceding dataset is unreadable while attempting to complete the repositioning request.

12. The system of claim 7, wherein the program instructions comprise additional program instructions configured to cause the one or more processors to perform the method further comprising:
- determining that the target data position is not located within the at least one preceding dataset based on the information associated with the at least one preceding dataset within the DSIT of the dataset;
- inspecting a cartridge memory (CM);
- ascertaining, based on inspecting the CM, that the updated dataset corresponding to the dataset is stored subsequent to the dataset; and
- attempting to complete the repositioning request by reading the updated dataset subsequent to the dataset.

13. A computer program product comprising one or more computer readable storage media, and program instructions collectively stored on the one or more computer readable storage media, the program instructions comprising instructions configured to cause one or more processors to perform a method of repositioning within a tape system, the method comprising:
- storing, within a dataset information table (DSIT) of a dataset on a tape medium, information associated with at least one preceding dataset on the tape medium, wherein the tape medium includes an updated dataset corresponding to the dataset and stored subsequent to the dataset, the updated dataset being written using suspended append write (SAW) and the updated dataset having an updated write pass (WP) counter;
- receiving a repositioning request specifying a target data position; and
- referencing the information associated with the at least one preceding dataset within the DSIT of the dataset while attempting to complete the repositioning request.

14. The computer program product of claim 13, wherein the information associated with the at least one preceding dataset includes at least one selected from a group consisting of: a write pass counter, a total record number, a total file mark (FM) number, a record number range, and a file mark range.

15. The computer program product of claim 13, wherein information associated with multiple respective preceding datasets are stored within the DSIT of the dataset, wherein a number of the multiple preceding datasets is based on a number of cut and paste multi segments.

16. The computer program product of claim 13, wherein the information associated with the at least one preceding dataset within the DSIT of the dataset is referenced in response to determining that the at least one preceding dataset is unreadable while attempting to complete the repositioning request.

17. The computer program product of claim 13, wherein program instructions comprise additional instructions configured to cause the one or more processors to perform the method further comprising:
- determining that the target data position is not located within the at least one preceding dataset based on the information associated with the at least one preceding dataset within the DSIT of the dataset;
- inspecting a cartridge memory (CM);
- ascertaining, based on inspecting the CM, that the updated dataset corresponding to the dataset is stored subsequent to the dataset; and
- attempting to complete the repositioning request by reading the updated dataset subsequent to the dataset.

* * * * *